United States Patent [19]

Zepeda, Sr.

[11] Patent Number: 5,894,691
[45] Date of Patent: Apr. 20, 1999

[54] TENSION ACTIVATED FISH BITE INDICATOR WITH DUAL ALARM

[76] Inventor: Lawrence Zepeda, Sr., 1131 Easy La., Nipomo, Calif. 93444

[21] Appl. No.: 08/855,289

[22] Filed: May 13, 1997

[51] Int. Cl.⁶ .................................................. A01K 85/01
[52] U.S. Cl. ................................................................ 43/17
[58] Field of Search ........................................ 43/17

[56] References Cited

U.S. PATENT DOCUMENTS

| | | |
|---|---|---|
| 3,680,244 | 8/1972 | Cala . |
| 3,878,635 | 4/1975 | Trosper . |
| 4,006,550 | 2/1977 | Rizzo . |
| 4,398,185 | 8/1983 | Roberts, Sr. ................. 43/17 |
| 4,541,195 | 9/1985 | Delaney . |
| 4,573,281 | 3/1986 | Moisan . |
| 4,633,608 | 1/1987 | Savarino . |
| 4,660,316 | 4/1987 | Gamelin . |
| 4,766,688 | 8/1988 | Hiles ............................. 43/17 |
| 5,010,678 | 4/1991 | Peck et al. . |
| 5,088,223 | 2/1992 | Chu et al. . |
| 5,157,857 | 10/1992 | Livingston . |
| 5,182,873 | 2/1993 | Aragon, Jr. . |
| 5,228,228 | 7/1993 | Meissner . |
| 5,321,391 | 6/1994 | Fox ............................... 43/17 |
| 5,396,726 | 3/1995 | Zepeda, Sr. . |

*Primary Examiner*—Michael J. Carone
*Assistant Examiner*—Fredrick T. French, III
*Attorney, Agent, or Firm*—Coudert Brothers

[57] ABSTRACT

A fish bite indicator in combination with a fishing rod and reel is provided to give an audible and/or a visual signal when the fishing line is under sufficient state of tension. An oscillating arm of the indicator extends below the rod. The fishing line is threaded in a loop at one end of the oscillating arm below the rod in such a way to cause the arm to move upward toward the rod when the line has sufficient tension to indicate a fish strike. The other end of the oscillating arm has a projection or projecting surface that activates an on/off switch electrically connected to a battery controlled printed circuit board including means for producing the audible and/or visual signal when the line is in sufficient tension to move the loop upward toward the rod.

27 Claims, 6 Drawing Sheets

TENSION ACTIVATED FISH BITE INDICATOR WITH DUAL ALARM

FIELD OF THE INVENTION

This invention relates generally to the field of fish bite indicators for use in combination with a fishing rod and a reel of fishing line. In particular, this invention is an improvement over the fish bite indicator disclosed and claimed by the present inventor, Lawrence Zepeda, in U.S. Pat. No. 5,396,726, issued Mar. 14, 1995, (Docket No. 6278/52614).

BACKGROUND OF THE INVENTION

Numerous fish bite indicators have been developed over the years, but they have failed to become popular because of their tendency to be either ineffective or so elaborate that they are too costly to the average sports fisherman. Examples of prior art bite indicators are disclosed and claimed in U.S. Pat. Nos. 4,006,550; 4,573,281; 4,660,316; 5,010,678; 5,088,223; 5,157,857; 5,182,873; and 5,228,228.

U.S. Pat. No. 4,006,550 has the desired simplicity. However, with the line fed through a loop at the end of the indicator above the reel, the indicator lacks sufficient sensitivity control for distinguishing fish strikes from wave action on the line and other environmental conditions. Furthermore, the indicator would be ineffective for the visually impaired.

U.S. Pat. Nos. 5,010,678 and 5,088,223 disclose fish bite indicators for the visually impaired. However, these indicators are examples of those that lack the simplicity of the indicator of the present invention.

U.S. Pat. No. 5,288,228 also discloses an indicator for the visually impaired. However, this indicator operates when there is significant movement of the tip of the reel. Such an indicator would be ineffective in high winds, heavy surf, high swells and other similar environmental conditions.

The other prior art patents listed above are of general interest to show the state of the art of various indicators having alarms for alerting a fisherman to the presence of a hooked fish on the line of a fishing rig.

U.S. Pat. No. 5,396,726 discloses and claims a fish bite indicator mountable on a fishing rod which comprises a switch activating arm operably attached to an oscillating arm for turning on a switch to activate an alarm when the fishing line is in sufficient tension to move the oscillating arm toward the fishing rod. Although this indicator has had commercial success, it has been found that the chief disadvantage of the indicator was the preferred switch activating arm disclosed and claimed the U.S. Pat. No. 5,396,726 patent became loose after frequent use rendering the indicator inoperative. There is a need for fish bite indicator that has all of the advantages of the indicator of the U.S. Pat. No. 5,396,726, but without the disadvantages.

SUMMARY OF THE INVENTION

The improved fish indicator for a fishing rod and reel of the present invention has the desired simplicity, solves the problem of greater sensitivity control to distinguish between a fish strike and environmental conditions and is designed to allow for greater useable life than the fish indicator of the U.S. Pat. No. 5,396,726.

The fish bite indicator of the U.S. Pat. No. 5,396,726 and the improved bite indicator of the present invention include housing that is either a separate housing easily mountable on the fishing rod or is a portion of a hollow handle of the rod adjacent to the reel and an oscillating arm having a lateral section at one end and a longitudinal section extending from the housing to a position below the rod. The fishing line is threaded in a loop at the other end of the oscillating arm below the rod in such a way to cause the loop to move upward toward the rod when the line has sufficient tension to indicate a fish strike. The fish bite indicator of the present invention includes within the housing or the hollow handle of the rod the following elements:

(1) an on/off switch;

(2) the lateral section extending from one end of the oscillating arm;

(3) a printed circuit board (PCB), (4) an alarm means electrically connected to the PCB and the switch for producing an audible alarm when the line is in sufficient tension; and (5) power source for said alarm means within the housing and electrically connected to the PCB.

The novel feature of the fish indicator of the present invention is to modify the oscillating arm of the U.S. Pat. No. 5,396,726 to include a projection or protrusion on at least a portion of the lateral section. The projection included on the oscillating arm of the present invention falls within the definition of the switch activating arm attached to a portion of the oscillating arm as disclosed and claimed in the U.S. Pat. No. 5,396,726. However, there is no suggestion in the latter patent of novel features of the presently claimed projection. The projection of the present invention has two distinct embodiments. In one embodiment, the projection is molded as an integral part of a portion of the lateral section immediately adjacent the on/off switch protruding from the PCB. In this embodiment, the entire oscillating arm preferably is thermoplastic and is injected molded with the projection protruding approximately in the center of the lateral section. In the preferred embodiment of the fish indicator of the present invention, a substantially cylindrical sleeve including the projection is mounted over or otherwise attached to the lateral section. In a more preferred embodiment, the sleeve has a length approximately equal to the length of the lateral section within the housing of the indicator and the projection extends along this entire length of the sleeve. The sleeve can be a thermoplastic and injected molded with the projection extending from its lateral surface. The sleeve is easily mounted by slipping over the end of a steel or similar metallic oscillating arm onto the lateral section. Further details of each of these embodiments are described below.

The PCB containing the switch is mounted so that the projection oscillates into contact with the on/off button of the switch in the indicating mode. In the indicating mode, the projection activates the switch when the line becomes taut to cause the loop of the oscillating arm to move upward toward the rod and to immediately oscillate the projection into the switch activating position. The compact nature of the PCB including the alarm means for producing an audible alarm permits placing the lateral section of the oscillating arm in close proximity to the PCB and the switch protruding therefrom.

In one embodiment of the fish indicator of the present invention, referred to as the fish indicating beeper, the PCB with an audible alarm comprises an a piezoelectric beeper found in smoke alarms mounted in the PCB circuit. In another embodiment of the fish indicator of the present invention, the PCB circuit also includes a visual alarm means, e.g. either a simple flashlight bulb or a light emitting diode. In a preferred embodiment of the present invention, the PCB circuit includes a switch to increase the audible alarm from a very low tone to a high pitch screech.

DETAILED DESCRIPTION OF THE PREFERRED EMBODIMENT

Figure 1:
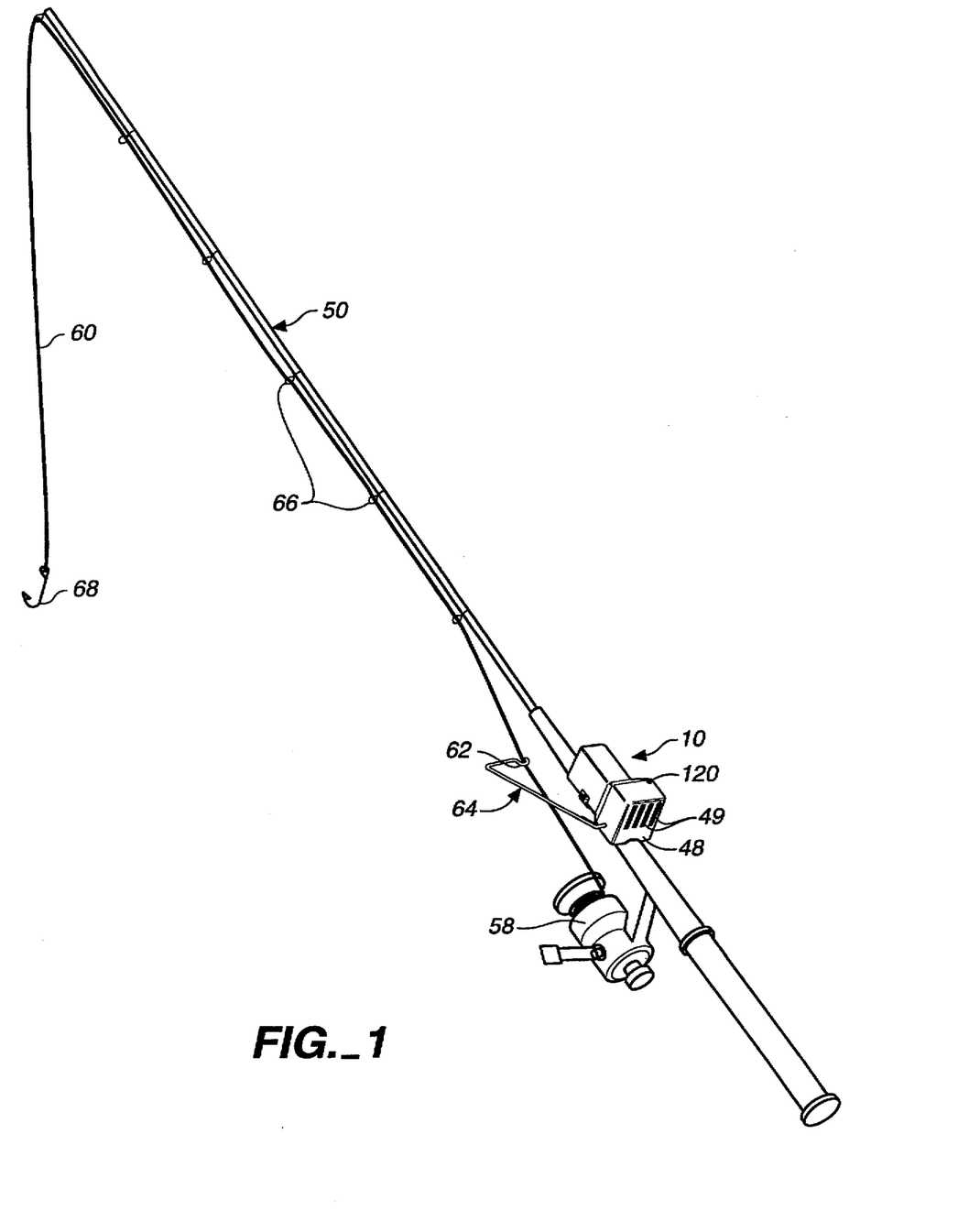
FIG. 1 is an isometric view of a fishing rod and reel with the preferred fish indicator of the present invention mounted thereon.
Figure 2A:
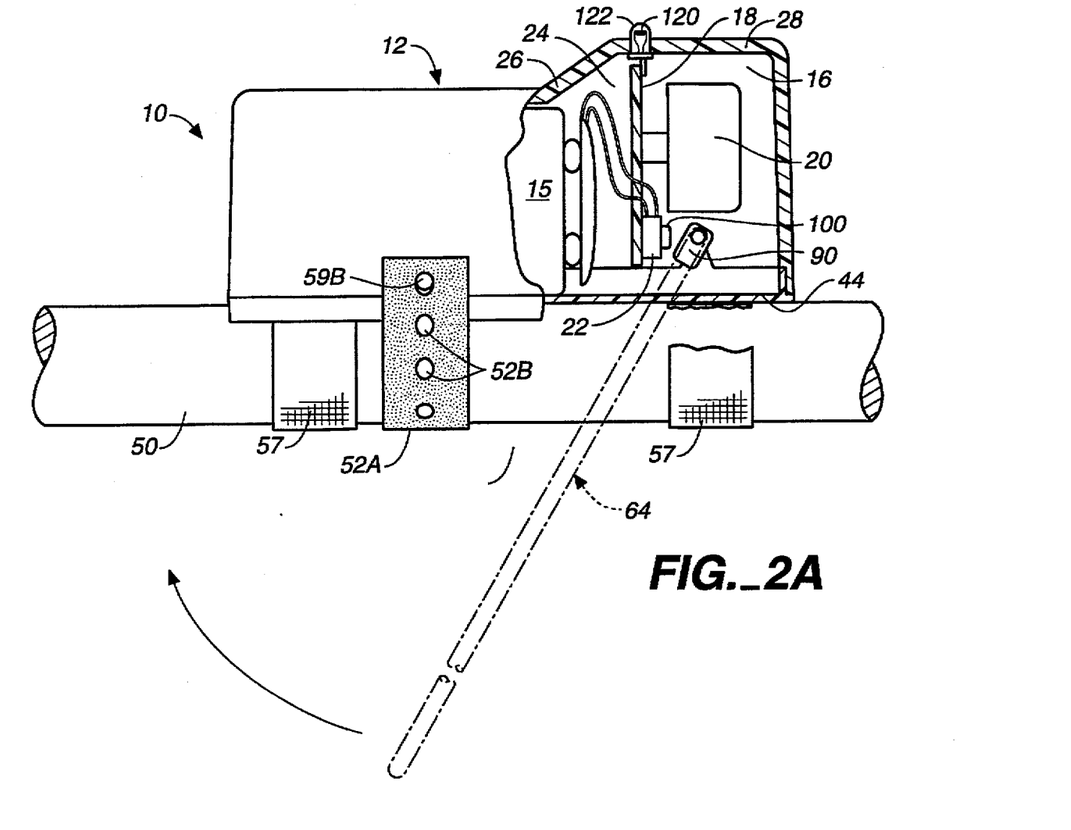
FIG. 2A is a longitudinal, vertical sectional view taken along line 2A—2A, partially in phantom, of the preferred fish indicator of the present invention in its normal non-indicating mode.
Figure 2B:
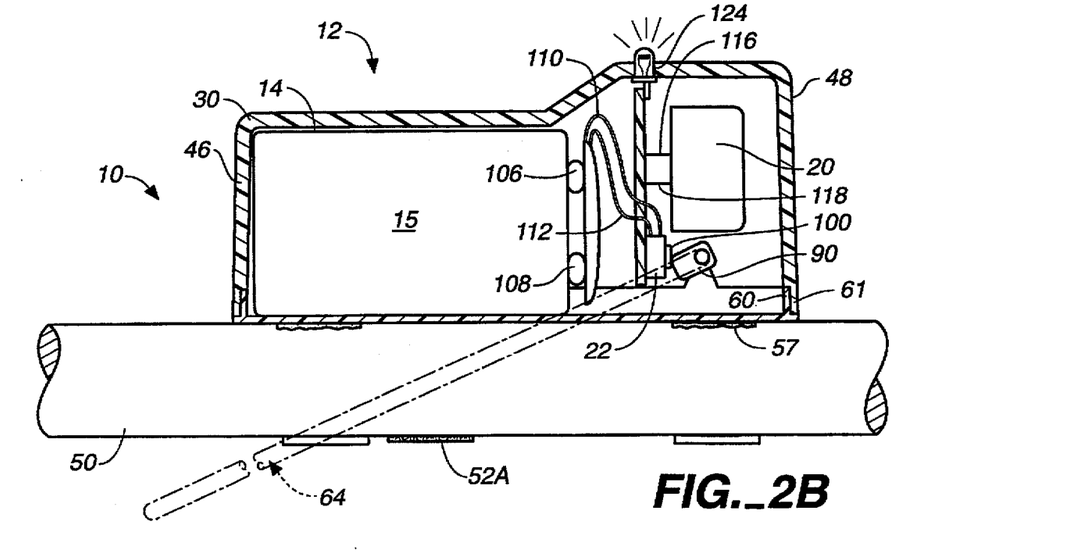
FIG. 2B is a longitudinal, vertical sectional view taken along line 2A—2A, partially in phantom, of the preferred fish indicator of the present invention in its fish indicating mode.
Figures 3A, 3B, 3C:
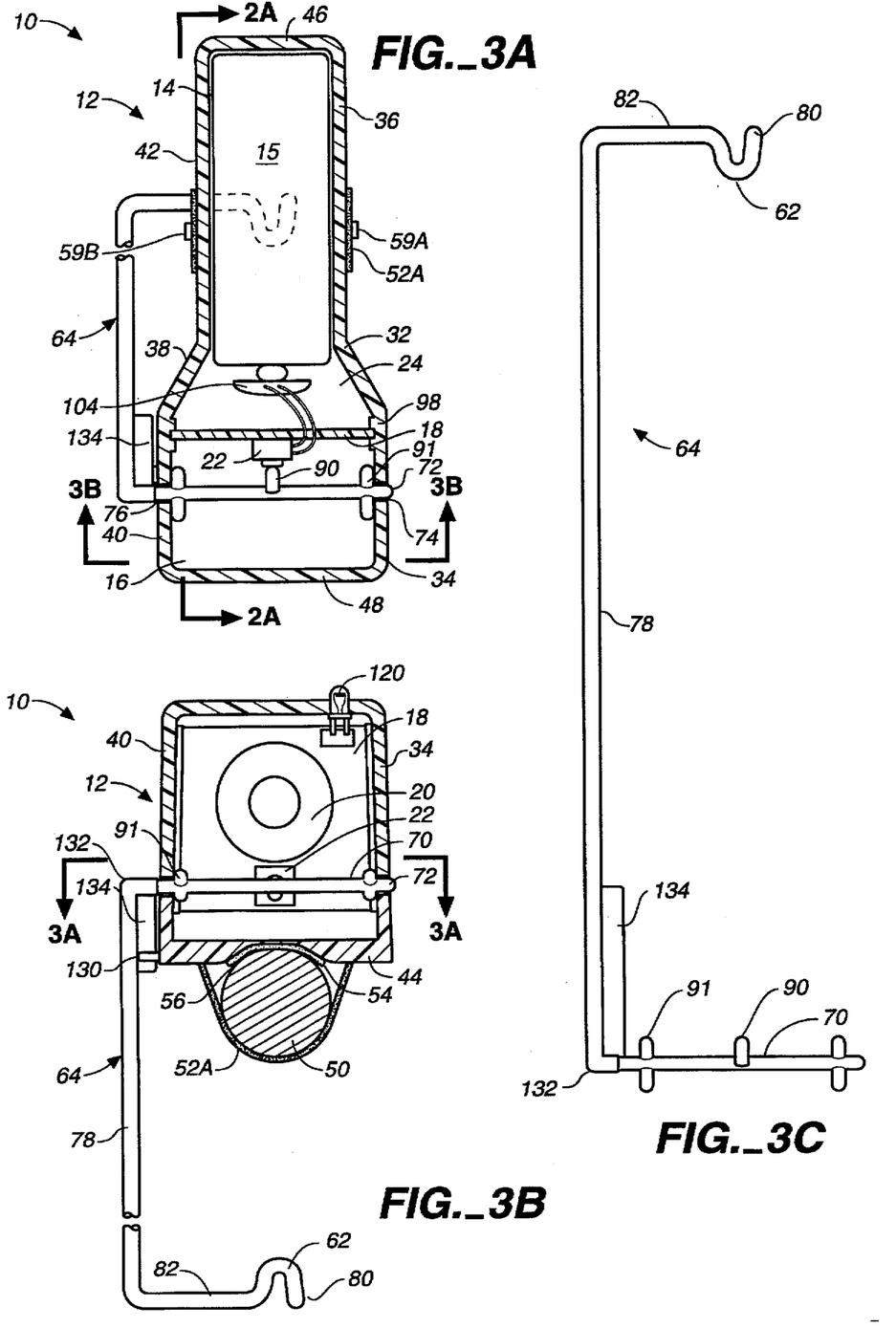
FIG. 3A is a top sectional view taken along line 3A—3A of one embodiment of the fish indicator of the present invention in its fish indicating mode.
FIG. 3B is a front sectional view taken along line 3B—3B of one embodiment of fish indicator of the present invention in its non-indicating mode illustrating one method for attaching the indicator to the rod.
FIG. 3C is a top view of one embodiment of the oscillating arm of the fish indicator of the present invention.

The fish indicator 10 of the present invention shown in FIGS. 1, 2A, 2B, 3A, 3B and 3C includes opaque plastic housing 12 manufactured by injection molding. Housing 12 had elongated battery compartment 14 for battery 15 and enclosure 16 for PCB 18, beeper or speaker 20 and on/off switch 22. The approximate overall dimensions of housing 12 were 1 9/16 inches (4 cm) in height, 1 5/8 inches (5 cm) in width and 3.25 inches (8.3 cm) in length. Compartment 14 was 1½ inches (3.8 cm) in height, 7/8 inches (2.2 cm) in width and 1 7/8 inches (4.6 cm) in length. Enclosure 16 was 1 9/16 inches (4 cm) in height, 1 5/8 inches (5 cm) in width and 1 inch (2.6 cm) in length. Transition region 24 between compartment 14 and enclosure 16 consisted of slanting top 26 extending between enclosure top 28 and compartment top 30, right slanting side 32 extending between enclosure right side 34 and compartment right side 36, and left slanting side 38 extending between enclosure left side 40 and compartment left side 42. The length of each of slanting top 26 and right and left slanting sides 32 and 38 was approximately ½ inch (1.5 cm). Removable bottom 44 of housing 12 extended between front 46 and back 48. Back 48 had four slots 49 (FIG. 1) for allowing the audible tone from speaker 20 to be easily heard. Housing 12 was mounted on conventional rod 50 by means of rubber strip 52A with adjustment holes 52B that was stretched around rod 50. Specifically, housing 12 was attached in one embodiment of the present invention, by means of two Velcro fastening tape pads 54 glued to curved groove 56 of bottom 44 (FIG. 3B), two corresponding Velcro interlocking tape pads 57 wrapped around rod 50 adjacent reel 58 and rubber strip 52A wrapped around rod 50. One of the holes 52B in each of the ends in strip 52A was stretched to fit over boss 59A on right side 36 and boss 59B on left side 42 of compartment 14 as shown in FIGS. 2A and 3A to permit indicator 10 to be easy mounted onto and dismounted from rod 50.

To periodically replace battery 15 or other indicator components, bottom 44 was removed from the remaining portion of housing 12 by holding the edges of bottom 44 and pulling right side wall 36 and left side wall 42 up and away from rod 50. Inner side walls 60 of bottom 44 have a tight fit connection with peripheral indentation 61 on each of right side walls 34 and 36, left side walls 40 and 42, right and left slanting walls 32 and 38 and front 46 and back 48 of housing 12 as shown in FIG. 2B. In addition, bottom 44 preferably is bolted to housing 12 so that bottom 44 does not separate from housing 12 due to violent action during use. Specifically, bottom 44 has a bolt sleeve (not shown) molded to extend upward approximately equal in height to the interior height of enclosure 16. The inner side of enclosure top 28 has a corresponding self-threading sleeve to accept the bolt.

After fish indicator 10 was mounted to rod 50, fishing line 60 was threaded through loop 62 of oscillating arm 64 and guides 66 and tied to hook 68 (FIG. 1). Loop 62 can be closed, but preferably loop 62 was open as shown for the convenience of threading line 60 therethrough. Oscillating arm 64 had first lateral section 70 having first end 72 through opening 74 in right side 34 of enclosure 16 (FIGS. 3A–3B). First lateral section 70 extended laterally through enclosure 16 and opening 76 in left side 40 of enclosure 16 to longitudinal section 78 adjacent left side 40. Longitudinal section 78 was substantially perpendicular to first lateral section 70 and extended generally along the longitudinal axis of rod 50 to a position below rod 50. Loop 62 in second end 80 of oscillating arm 64 was on second lateral section 82 which was also substantially perpendicular to longitudinal section 78. Loop 62 was positioned for maintaining line 60 directly below reel 58 during the non-indicating mode of indicator 10 as shown in FIG. 2A. Orienting loop 62 in this position has the advantage of using the bottom of rod 50 as a stop for further upward movement of second lateral section 82 in the indicating mode of indicator 10 as shown in FIG. 3A. Projecting from at least a portion of first lateral section 70 was projection 90 for activating on/off switch 22 when line 60 was in sufficient tension to move loop 62 upward toward rod 50 and to oscillate projection 90 into the indicating mode of indicator 10.

One embodiment of fish indicator 10 is shown in FIGS. 2A, 2B, 3A and 3B. In this embodiment, projection 90 was integrally molded onto first lateral section 70 of oscillating arm 64 consisting of a thermolplastic material, e.g., polyurethane. In addition, at each end of first lateral section 70 immediately adjacent to the interior of right side 34 and left side 40 of enclosure 16 were guide projections 91 integrally molded on first lateral section 70 to serve as positioning guides within enclosure 16.

Figures 4A, 4B, 4C:
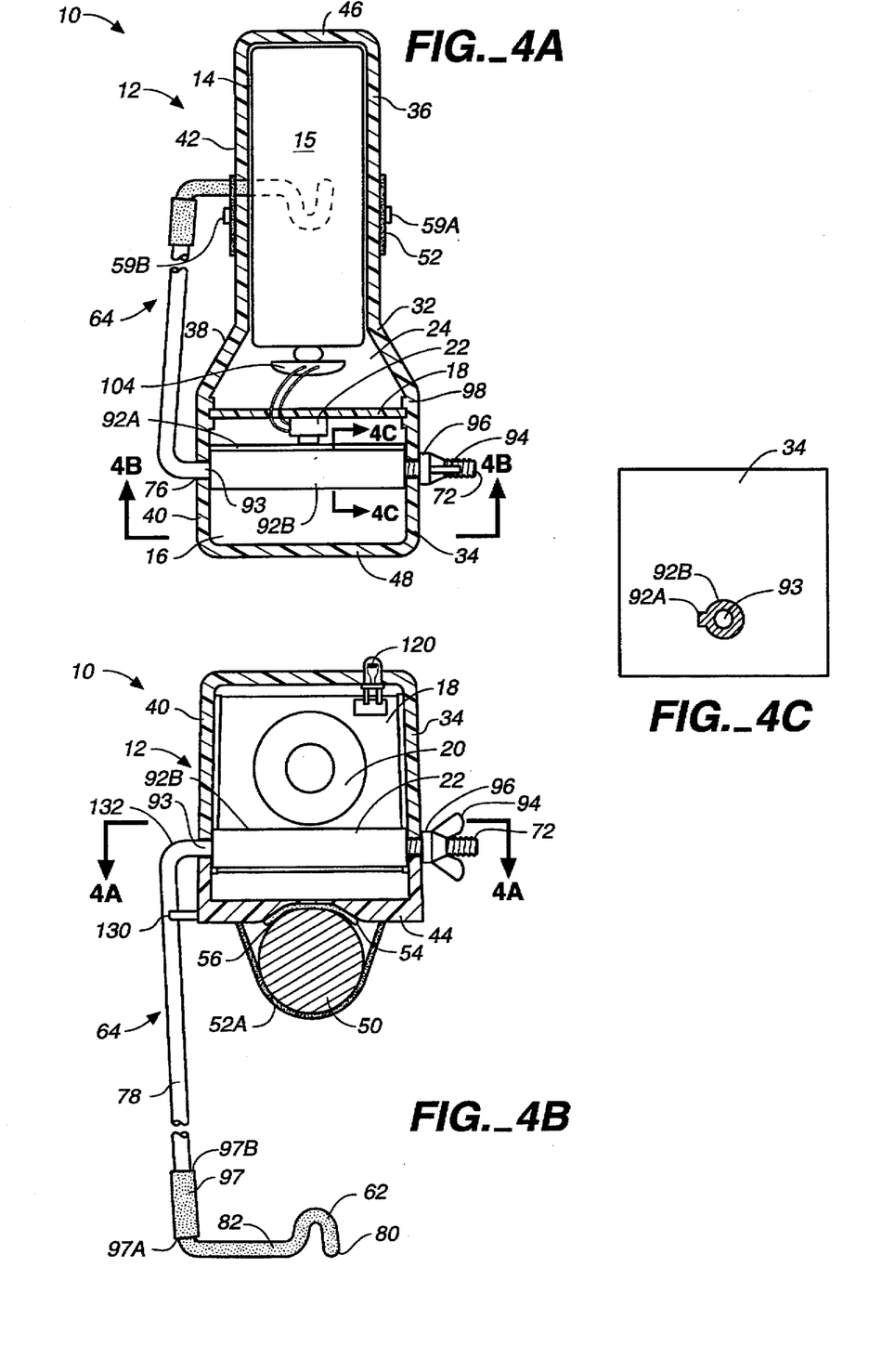
FIG. 4A is a top sectional view taken along line 4A—4A of the preferred fish indicator of the present invention in its fish indicating mode showing the oscillating arm tensioning means.
FIG. 4B is a front sectional view taken along line 4B—4B of the preferred fish indicator of the present invention in its non-indicating mode showing the oscillating arm tensioning means.
FIG. 4C is a cross-sectional view taken along line 4C—4C of the lateral section of the oscillating arm showing the sleeve with the projection of the preferred embodiment of fish indicator of the present invention.

In the preferred embodiment of fish indicator 10 shown in FIG. 4A, 4B and 4C, projection or projecting surface 92A extends substantially along the entire length of separately injection molded thermoplastic sleeve 92B. Sleeve 92B is slipped over and glued to substantially the entire width of first lateral section 93 of a steel oscillating arm 64. In this preferred embodiment, the portions of projecting surface 92A immediately adjacent to the interior of right side 34 and left side 40 serve not only as positioning guides, but as tensioning stops for tensioning means which can simply be wing nut 94 and nylon washer 96 that are tightened onto a threaded portion of the first lateral section 93 adjacent right side 34 of enclosure 16. In this preferred embodiment, right side 34 and left side 40 have sufficient flexibility to allow the tightening of wing nut 94 to produce variable tension on first lateral section 93. Therefore, as nut 94 is tightened against right side 34, the tension on oscillating arm 64 is increased and the sensitivity of arm 64 to normal environmental conditions of line 60 is diminished and its ability to distinguish a fish strike from such normal conditions is increased. In addition, it has been found that it is preferred to manufacture oscillating arm 64 with different materials of construction. One piece is first lateral section 70 and longitudinal section 78 and comprises steel or an equivalent metal. The second piece is plastic sleeve 97 (FIG. 4B) having first end 97A and second end 97B placed over the end of longitudinal section 78 distal first end 72. Second lateral section 82 having loop 62 at end 80 has an right angle elbow at the other end and consists of a solid piece of plastic which is glued to first end 79A of plastic sleeve 97. The use of plastic materials in place of steel or other metal for loop 62 provides a smoother guide to line 60.

Although switch 22 electrically connected to PCB 18 was a single pole switch, catalog no. SW400-ND manufactured by Digi-Key, any conventional on/off switch can be easily adapted for use with the present indicator 10. PCB 18 was removably positioned within enclosure 16 by sliding between raised ridges or rails 98 (FIGS. 3A and 4A) on the interior of right side 34 and left side 40. PCB 18 was designed and specifically positioned within enclosure 16 so that on/off button 100 of switch 22 was immediately adjacent to projection 90 or the center portion of the edge of projecting surface 92A. This permitted button 100 to easily become engaged and disengaged during oscillations of oscillating arm 64.

An ordinary 9 volt battery 15, e.g. a Panasonic® battery, was placed within battery compartment 12 that was designed to provide close tolerance between the outside surface of battery 15 and the inner surface of compartment 12. Conventional battery cap 104 of battery 15 was placed over negative terminal 106 and positive terminal 108 of battery 15 with the respective negative and positive lead wires 110 and 112 making the respective electrical connections to on/off switch 22.

Solid speaker 20, manufactured and sold under catalog no. P9909-ND by Digi-Key, served as the audible alarm means. Negative and positive lead wires 116 and 118 of speaker 20 were respectively connected to the corresponding contacts of PCB 18. PCB 18 was also designed so that speaker 20 was within the center portion of enclosure 16. Any similar type of beeper may be used.

In the preferred embodiment, LED 120 within transparent housing 122, as shown in FIGS. 2A, 2B, 3B, and 4B, was mounted on PCB 18 with transparent housing 122 extending through opening 124 in enclosure top 28.

Arm support 130, molded as a protrusion on the exterior of left side 40 (FIGS. 3B and 4B), supported oscillating arm 64 when line 60 was not under tension in the non-indicating mode. A molded flat projection along a portion of longitudinal section 78 adjacent to right angle bend 132 of oscillating arm 64 served as arm rest 134 (FIGS. 3A, 3B, and 3C). A small portion of arm rest 134 contacted arm support 130 in the non-indicating mode. The tensioning means shown in FIGS. 4A and 4B eliminates the need to have arm rest 134 attached to longitudinal section 78. When a fish struck hook 68 and placed tension on line 60, arm rest 134 moved upward off arm support 130 and toward rod 50 causing projection 90 to engage button 100 which activated LED 120 to the on position and beeper 20 to emit variable tone from speaker 20. The tone of speaker 20 was controlled by using 5K ohm variable resistor manufactured and sold under catalog no. K0A53-ND by Digi-Key electrically connected to PCB 18. The tone of speaker 20 was easily adjusted by means of a small screw driver placed through a hole (not shown) in left side 40.

Figure 5:
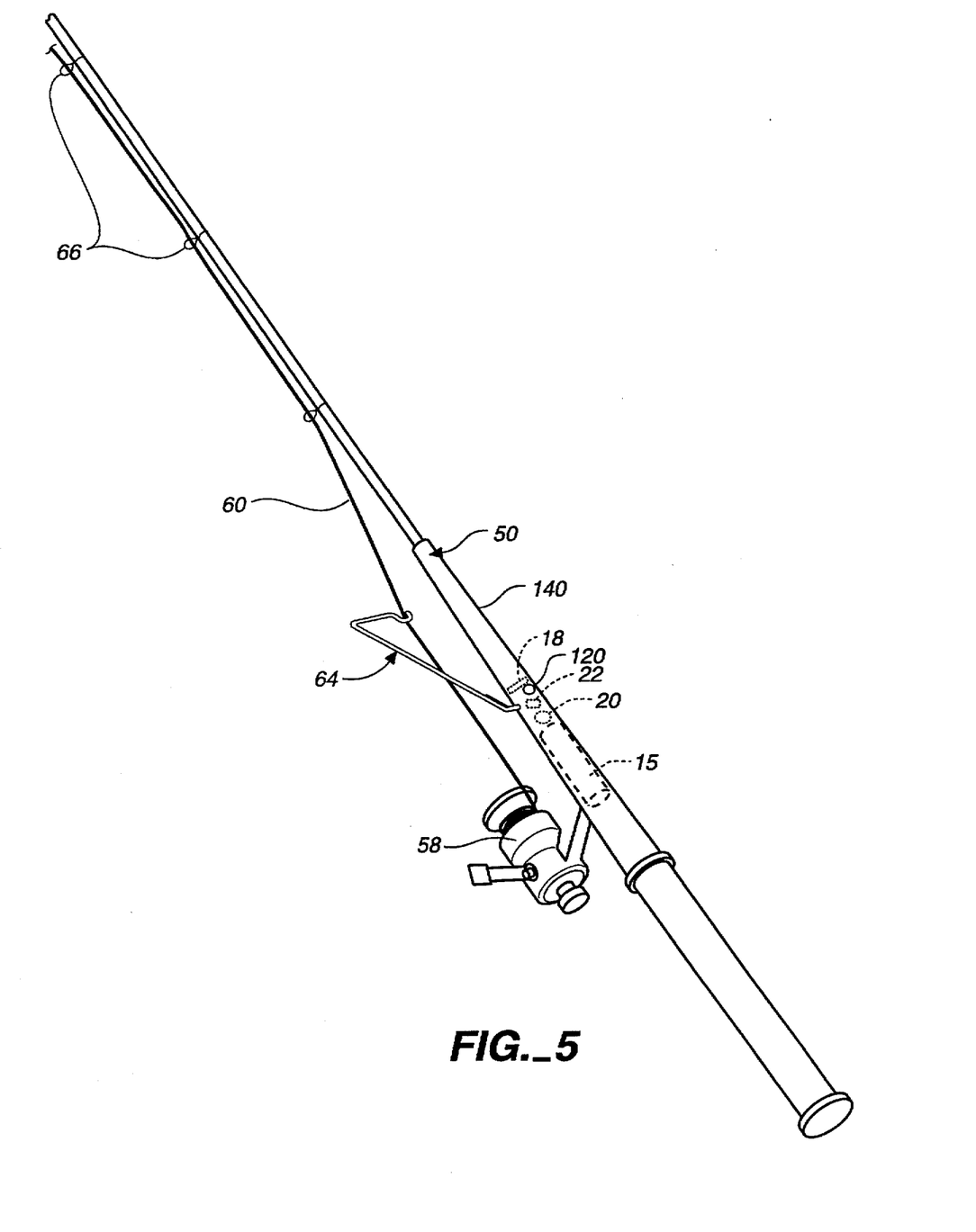
FIG. 5 is a partial isometric view of a fishing rod and reel in which the fish indicator of the present invention is integrally combined within the rod.

FIG. 5 illustrates another embodiment of the indicator of the present invention in which the indicator forms an integral part of the fishing rod. In this embodiment, the internals of housing 10 shown in FIGS. 2A, 2B, 3A, 3B, 3C, 4A, 4B and 4C, e.g. PCB 18, switch 22, speaker 20, battery 15 and LED 120, are operably mounted within or on hollow handle 140 of rod 50 and oscillating arm 64 extends from rod 50 as shown. It this embodiment, instead of the housing described above, the housing is cylindrical with a circular cross-section. It is apparent that the indicator may have other cross-sections from square, rectangular, octagonal and the like.

Figures 6, 7:
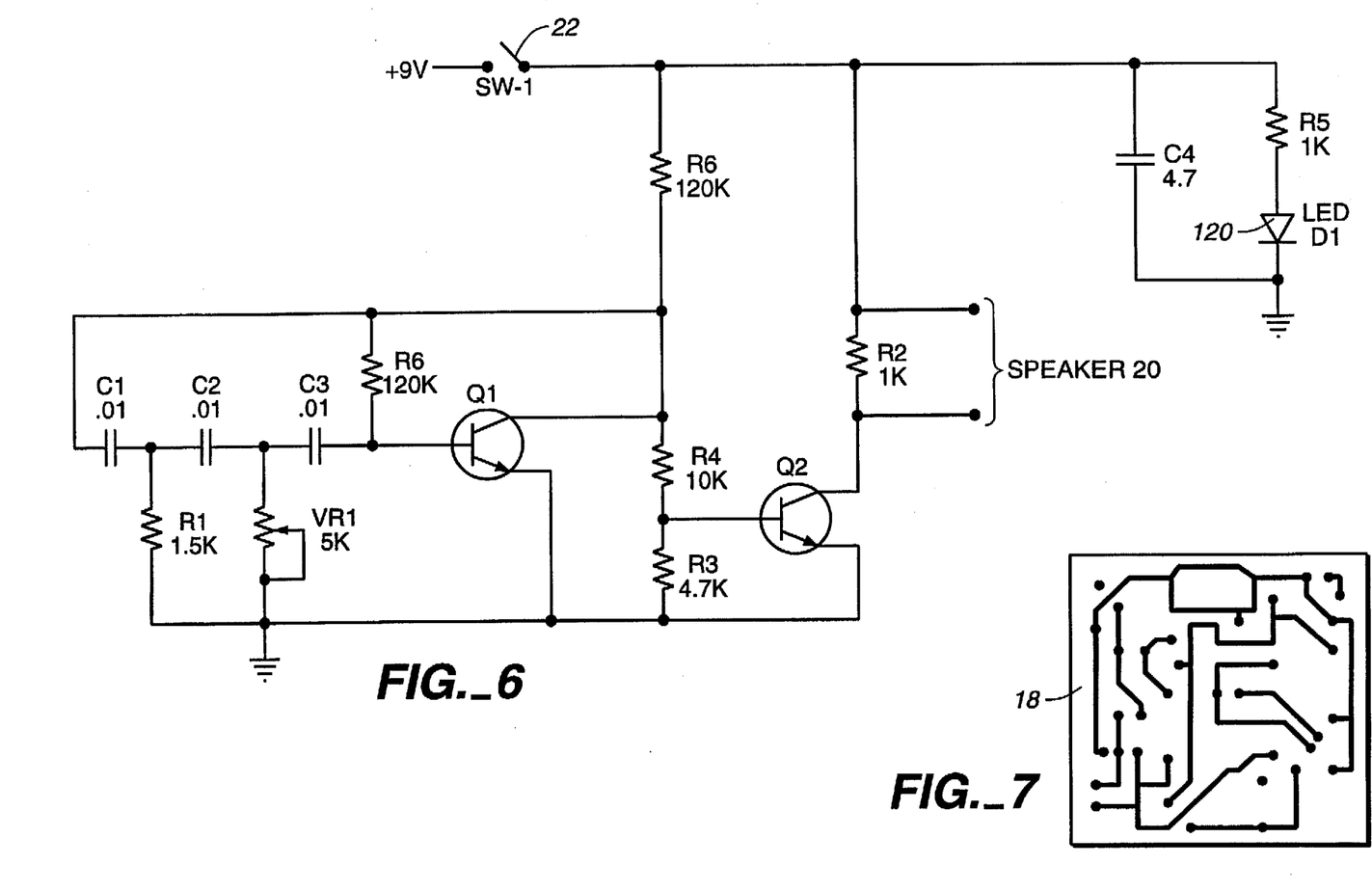
FIG. 6 is a block schematic diagram of an exemplary electronic circuit mounted on one side of the PCB of the fish indicator of the present invention.
FIG. 7 is a schematic diagram of the solder connections for the exemplary electronic circuit shown in FIG. 6 extending through to the solder side of the PCB.

FIG. 6 is a schematic diagram of the electronic circuit for the preferred embodiment of the present invention. When SW-1, shown in FIGS. 2A and 2B as on/off switch 22, was in the on position, direct current from battery 15 through R5 activated red LED diode D1 or LED 120 shown in FIGS. 1, 2A, 2B, 3B, 4B and 5. Simultaneously, direct current through the simple oscillator, Q2, and R2, R3 and R4 serve as an amplifier to amplify the signal from Q1 and to provide the signal to solid state speaker 20. Variable resister VR1 changes the tone (frequency) on speaker 20 from a low pitch to a high pitched screech. A complete list of the components for the circuit shown in FIG. 6 are set forth in Table 1 below.

TABLE 1

| ITEM | DESIGNATION | PART NO. | DESCRIPTION |
|---|---|---|---|
| 1 | C1–C3 | 1103PHCT-ND | 0.01 µF AXIAL LEAD CAP |
| 2 | C4 | P2036-ND | 4.7 µF TANT FILTER CAP |
| 3 | D1 | P363-ND | RED LED |
| 4 | Q1–Q2 | 2N4401-ND | 2N4401 NPN TRANSISTOR |
| 5 | R2, R5, R7 | IKE-ND | 1K OHMS 1/8 WATT RESISTOR |
| 6 | R1 | 1.5KE-ND | 1.5K OHMS 1/8 WATT RESISTOR |
| 7 | R3 | 4.7KE-ND | 4.7K OHMS 1/8 WATT RESISTOR |
| 8 | R4 | 10KE-ND | 10K OHMS 1/8 WATT RESISTOR |
| 9 | R6 | 120KE-ND | 120K OHMS 1/8 WATT RESISTOR |
| 10 | VR1 | K0A53-ND | 5K OHM VARIABLE RESISTOR |
| 11 | SPEAKER 20 | P9909-ND | SOLID STATE SPEAKER |

TABLE 1-continued

| ITEM | DESIGNA-TION | PART NO. | DESCRIPTION |
| --- | --- | --- | --- |
| 12 | SW1 | SW400-ND | SINGLE POLE SWITCH |
| 13 | PJ1 | BS61-ND | BATTERY CONNECTOR |
| 14 | PC1 | | PC BOARD |

FIG. 7, is a schematic diagram of the solder side of PCB 18 showing solder connections for the leads from the exemplary electronic circuit shown in FIG. 6. In the manufacture of PCB 18, twelve individual PCB's are cut from one board after the components are assembled and the approximately 40 connecting lead junctions for each PCB 18 are soldered.

Various embodiments of the fish indicator of the present invention have been illustrated. It is apparent that they may be easily modified by removing LED 120 to result in a fish indicating beeper. Alternatively, beeper 20 and the respective lead wires may be removed to result in a fish indicating light. In addition, the additional embodiments disclosed in U.S. Pat. No. 5,396,726, the pertinent portions of which are incorporated herein by reference, may be substituted for the means to attach the fish indicator to the rod and for the exact positioning of loop 62 at the end of oscillating arm 64. Without departing from the spirit and scope of this invention, one of ordinary skill in the art can make the foregoing modifications and many other changes and modifications to the indicator of the present invention to adapt it to specific usages and conditions. As such, these changes and modifications are properly, equitably, and intended to be, within the full range of equivalents of the following claims.

What is claimed is:

1. A fish bite indicator for use in combination with a fishing rod having a reel and line extending therefrom, said indicator comprising:
   (a) a housing having front and back ends, a right side wall, a left side wall, a top, and a removable bottom mountable on the rod adjacent to the reel and having a longitudinal axis parallel to that of the rod;
   (b) a printed circuit board (PCB) mounted within said housing;
   (c) an on/off switch electrically connected to said PCB;
   (d) an oscillating arm having a first end and a second end, a lateral section extending from the first end laterally through the right side wall of said housing to a longitudinal section extending along the longitudinal axis to a position below the rod, guide projections extending from said lateral section within said housing and adjacent to the right and left side walls thereof, and a loop in the second end of said arm below the reel for maintaining the line below the longitudinal section of said arm, extending on at least a portion of the lateral section is a projection which activates said switch when the line is in sufficient tension to move the loop of said oscillating arm upward toward the rod and to oscillate said projection into a switch activating position;
   (e) an alarm means electrically connected to said PCB and said switch for producing an audible alarm when the line is in sufficient tension; and
   (f) battery power source for said alarm means within said housing and electrically connected to said PCB.

2. The fish bite indicator of claim 1 wherein said alarm means also comprises a visual alarm means and extending from the exterior of said housing.

3. The fish bite indicator of claim 2 wherein said visual alarm comprises a light emitting diode electrically connected to said PCB.

4. The fish bite indicator of claim 1 wherein said audible alarm comprises a beeper.

5. The fish bite indicator of claim 1 wherein a tensioning means is attached to the lateral section adjacent to the first end of said oscillating arm exterior to said housing for changing the sensitivity of the tension required to activate said switch.

6. The fish bite indicator of claim 5 wherein said housing consists of a plastic material and wherein at least a portion of the first end of said oscillating arm is threaded and is laterally extended from the right side wall and wherein said tensioning means comprises a fastener on the threaded portion of the first end to vary the compression on the guide projections of the lateral section between the right and left side walls.

7. The fish bite indicator of claim 1 wherein a protrusion extends from the exterior of the left side of said housing to support said oscillating arm in its original non-switch activating position.

8. The fish bite indicator of claim 7 wherein an arm rest extends along a portion of the longitudinal section of said oscillating arm adjacent to the left side of said housing and at least an edge of which is in contact with the housing protrusion when said oscillating arm in its non-switch activating position.

9. The fish bite indicator of claim 1 wherein Velcro pads are used to mount the bottom of said housing to the rod.

10. The fish bite indicator of claim 9 wherein a combination of Velcro pads and a flexible strip are used to mount the bottom of said housing to the rod.

11. The fish bite indicator of claim 1 wherein said rod has a hollow handle to serve as said housing.

12. The fish bite indicator of claim 1 wherein said oscillating arm consists of a plastic material and wherein the projection and guide projections are integral with the lateral section of said oscillating arm.

13. The fish bite indicator of claim 1 wherein a sleeve including a projecting surface to serve as said projection and said guide projections is mounted to encircle substantially the entire length of the lateral section of said oscillating arm between the right and left side walls.

14. The fish bite indicator of claim 1 wherein said oscillating arm has a second lateral section extending from longitudinal section parallel to the lateral section to the loop at the second end of said oscillating arm for maintaining the line under the reel.

15. The fish bite indicator of claim 1 wherein an adjusting means is electrically connected to said PCB for adjusting the tone of the audible alarm.

16. A fish bite indicator for use on a fishing rod having a hollow handle, a reel and line extending therefrom, said indicator comprising:
   (a) an on/off switch attached within the hollow handle;
   (b) an oscillating arm having a lateral section extending from a first end laterally through the right side of the hollow handle of said rod adjacent to said reel to a longitudinal section extending along the longitudinal axis to a position below the rod, guide projections extending from said lateral section within said hollow handle and adjacent to the right and left sides of said handle, and a loop adjacent to a second end of said arm below the reel for maintaining the line below the longitudinal section of said arm, extending along at least a portion of the lateral section is a projection which activates said switch when the line is in sufficient tension to move the loop of said oscillating arm upward toward the rod and to oscillate said projection into a switch activating position;

(c) a PCB within the hollow handle and electrically connected to said switch;

(d) an alarm means electrically connected to said PCB and said switch for producing an audible alarm when the line is in sufficient tension; and (f) battery power source for said alarm means within said housing and electrically connected to said PCB.

17. The fish bite indicator of claim 16 wherein said alarm means also comprises a visual alarm means and extending from the exterior of the hollow handle.

18. The fish bite indicator of claim 17 wherein said visual alarm comprises a light emitting diode electrically connected to said PCB.

19. The fish bite indicator of claim 17 wherein said audible alarm comprises a beeper.

20. The fish bite indicator of claim 16 wherein adjusting means are provided for adjusting the tone of the audible alarm.

21. The fish bite indicator of claim 16 wherein a tensioning means is attached to the lateral section adjacent to the first end of said oscillating arm exterior to said handle for changing the sensitivity of the tension required to activate said switch.

22. The fish bite indicator of claim 21 wherein the hollow arm consists of a plastic material, wherein at least a portion of the first end of said oscillating arm is threaded and is laterally extended from the right side of the handle, and wherein said tensioning means comprises a fastener on the threaded portion of the first end to vary the compression on the projections between the sides of the handle.

23. The fish bite indicator of claim 22 wherein a protrusion extends from the exterior of left side of said handle to support said oscillating arm in its original non-switch activating position.

24. The fish bite indicator of claim 22 wherein an arm rest extends along a portion of the longitudinal section of said oscillating arm adjacent to the left side of said handle and at least an edge of which is in contact with the handle protrusion when said oscillating arm in its original non-switch activating position.

25. The fish bite indicator of claim 22 wherein said oscillating arm consists of a plastic material and wherein said projection and said guide projections are integral with the lateral section of said oscillating arm.

26. The fish bite indicator of claim 22 wherein a sleeve including projecting surface to serve as said projection and said guide projections is mounted to encircle substantially the entire length of the lateral section of said oscillating arm between the right and left sides of the handle.

27. The fish bite indicator of claim 22 wherein said oscillating arm has a second lateral section extending from the longitudinal section parallel to the lateral section to the loop at the second end of said oscillating arm for maintaining the line under the reel.

* * * * *